(12) United States Patent
Erbes et al.

(10) Patent No.: US 6,434,208 B1
(45) Date of Patent: Aug. 13, 2002

(54) JET PUMP BEAM LOCK

(75) Inventors: John G. Erbes, Mt. View; James D. Adam, Livermore, both of CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/773,169

(22) Filed: Jan. 31, 2001

(51) Int. Cl.$^7$ .............................................. G21C 19/00
(52) U.S. Cl. ....................... 376/260; 376/372; 376/379; 376/407; 417/63
(58) Field of Search ................... 376/260, 372, 376/407, 285, 379, 392, 393; 417/63, 151; 411/84

(56) References Cited

U.S. PATENT DOCUMENTS 5,515,407 A * 5/1996 Bevilacqua et al. ........ 376/372
5,752,807 A    5/1998 Erbes ........................... 417/63
6,052,425 A    4/2000 Erbes et al. ................. 376/260

* cited by examiner

*Primary Examiner*—Michael J. Carone
*Assistant Examiner*—Daniel Matz
(74) *Attorney, Agent, or Firm*—Armstrong Teasdale LLP

(57) ABSTRACT

A jet pump beam bolt locking assembly includes a locking sleeve having a plurality of ratchet teeth extending around the periphery of a base portion, and a lock plate having a beam bolt opening, and an integral beam spring arm having a plurality of ratchet teeth extending from at least a portion of a side of the spring arm. The spring arm ratchet teeth are sized to mesh with the locking sleeve ratchet teeth. The lock plate also includes a lip extending at least partially around the beam bolt opening which captures the locking sleeve. The spring arm is movable between a first position where a lock plate detent is positioned in a spring arm notch which permits engagement of the ratchet teeth, and a second position where the side of the spring arm is in contact with the detent which disengages the ratchet teeth to permit loosening of the beam bolt.

22 Claims, 4 Drawing Sheets

JET PUMP BEAM LOCK

BACKGROUND OF THE INVENTION

This invention relates generally to nuclear reactors and more particularly, to apparatus for securing jet pump assemblies within a nuclear reactor pressure vessel.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

In a BWR, hollow tubular jet pumps positioned within the shroud annulus provide the required reactor core water flow. The upper portion of the jet pump, known as the inlet mixer, is laterally positioned and supported against two opposing rigid contacts within restrainer brackets by a gravity actuated wedge. The inlet mixers are each held in place at the top end by a preloaded beam. To secure the assembly, the jet pump beam is assembled with a high preload, applied by installing the jet pump beam bolt with a hydraulic tensioner.

High static and dynamic jet pump flow loads on the inlet mixer can, under some conditions such as insufficient beam preload, cause oscillating motion and detrimental vibration excitation in the jet pump. The resultant increased vibration levels and corresponding vibration loads on the piping and supports can cause jet pump component degradation from wear and fatigue. Extreme component degradation can require plant shutdown. To assure the required preload is maintained, the beam bolt is securely locked to prevent loosening after tensioning is completed. The locking device design and engagement actuation must not interfere with operation of the tensioner. Typically, the beam bolt is locked by tack welding a sleeve lock, or keeper, which mates with the bolt hex drive, to a lock plate attached to the beam. This arrangement requires complex welding equipment which must function in the reactor under about 60 feet of water. The tack welding must be performed each time the jet pump is disassembled for cleaning or other maintenance, which consumes time on the limited reactor servicing critical path schedule. Additional delays can also occur due to the difficulty of performing the welding in the reactor with consistent quality. The keeper tack welds are broken each time the jet pump is disassembled, and the keeper can only be reused a few times before requiring replacement. This requires additional outage maintenance time.

It would be desirable to provide a mechanical locking device to replace the tack-welded keeper beam bolt locking arrangement. It would also be desirable to provide a mechanical locking device that facilitates assembly and disassembly of the jet pump.

BRIEF SUMMARY OF THE INVENTION

In an exemplary embodiment, a locking device for a jet pump beam, includes a locking sleeve sized to receive a jet pump beam bolt The locking sleeve includes a base portion having an upper surface, and a plurality of ratchet teeth extending around the periphery of the base portion. The locking device further includes a lock plate having a beam bolt opening, and an integral beam spring arm. The beam bolt opening is sized to receive the locking sleeve. The spring arm includes a plurality of ratchet teeth extending from at least a portion of a side of the spring arm facing the center of the beam bolt opening. The spring arm ratchet teeth are sized to mesh with the locking spring ratchet teeth.

The lock plate also includes a lip extending at least partially around the beam bolt opening, and the lip is sized to engage the upper surface of the locking sleeve base portion. Further, the lock plate includes at least one guide pin opening sized to receive a jet pump beam guide pin.

The spring arm includes a notch adjacent the ratchet teeth. The notch is sized to receive a detent extending from the lock plate. The spring arm is movable between a first position where the detent is positioned in the notch and the spring arm ratchet teeth are engaged with the locking sleeve ratchet teeth, and a second position where the side of the spring arm facing the center of the beam bolt opening is in contact with the detent and the spring arm ratchet teeth are disengaged from the locking sleeve ratchet teeth.

The above described locking device replace the tack-welded keeper beam bolt locking arrangement of known jet pumps. Also, the above described locking device is reusable and facilitates simplified assembly and disassembly of the jet pump with a minimum of labor and equipment.

DETAILED DESCRIPTION OF THE INVENTION

Figure 1:
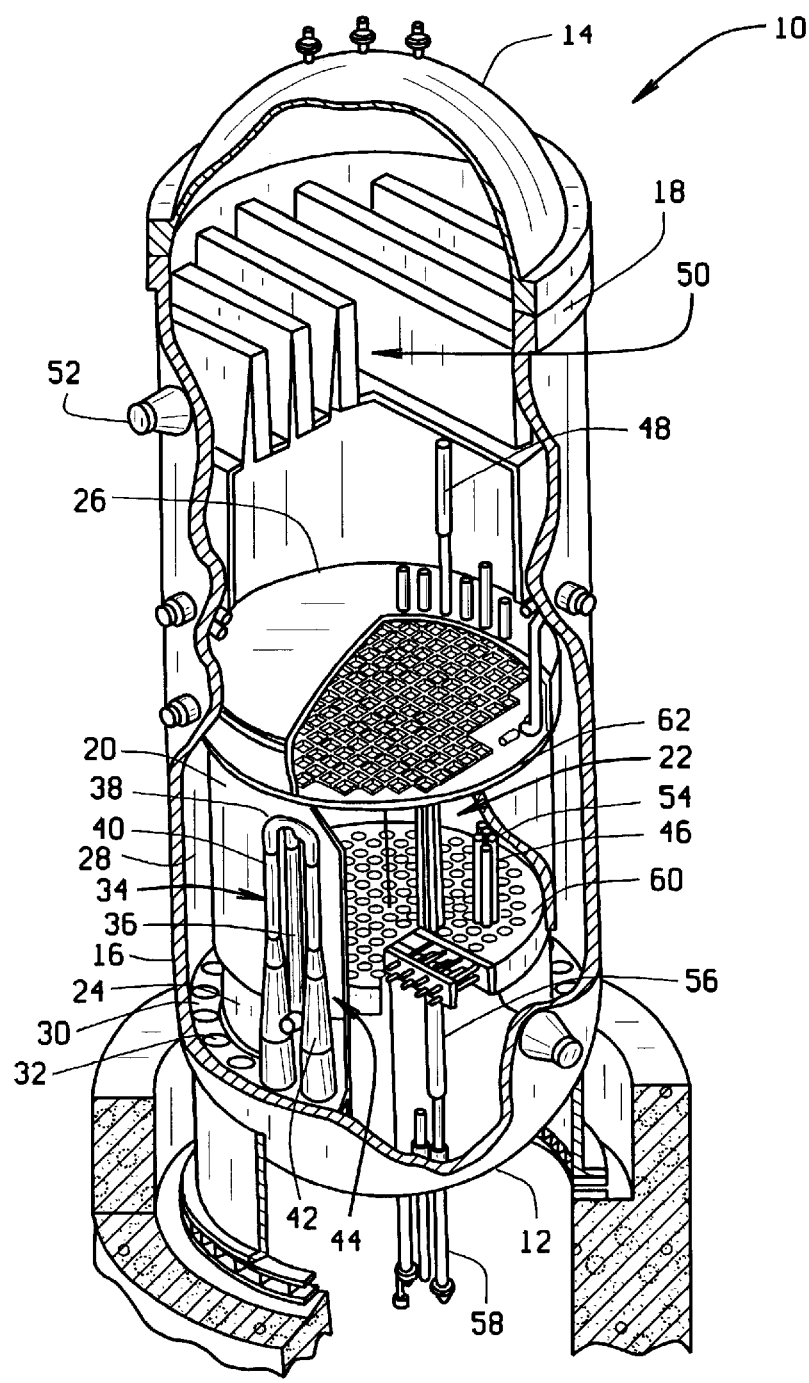
FIG. 1 is a sectional view, with parts cut away, of a boiling water nuclear reactor pressure vessel.

FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. Side wall 16 includes a top flange 18. Top head 14 is attached to top flange 18. A cylindrically shaped core shroud 20 surrounds a reactor core 22. Shroud 20 is supported at one end by a shroud support 24 and includes a removable shroud head 26 at the other end. An annulus 28 is formed between shroud 20 and side wall 16. A pump deck 30, which has a ring shape, extends between shroud support 24 and RPV side wall 16. Pump deck 30 includes a plurality of circular openings 32, with each opening housing a jet pump 34. Jet pumps 34 are circumferentially distributed around core shroud 20. An inlet riser pipe 36 is coupled to two jet pumps 34 by a transition assembly 38. Each jet pump 34 includes an inlet mixer 40, and a diffuser 42. Inlet riser 36 and two connected jet pumps 34 form a jet pump assembly 44.

Heat is generated within core 22, which includes fuel bundles 46 of fissionable material. Water circulated up through core 22 is at least partially converted to steam. Steam separators 48 separates steam from water, which is recirculated. Residual water is removed from the steam by steam dryers 50. The steam exits RPV 10 through a steam outlet 52 near vessel top head 14.

The amount of heat generated in core 22 is regulated by inserting and withdrawing control rods 54 of neutron absorbing material, such as for example, hafnium. To the extent that control rod 54 is inserted into fuel bundle 46, it absorbs neutrons that would otherwise be available to promote the chain reaction which generates heat in core 22. Control rod guide tubes 56 maintain the vertical motion of control rods 54 during insertion and withdrawal. Control rod drives 58 effect the insertion and withdrawal of control rods 54. Control rod drives 58 extend through bottom head 12.

Fuel bundles 46 are aligned by a core plate 60 located at the base of core 22. A top guide 62 aligns fuel bundles 46 as they are lowered into core 22. Core plate 60 and top guide 62 are supported by core shroud 20.

Figure 2:
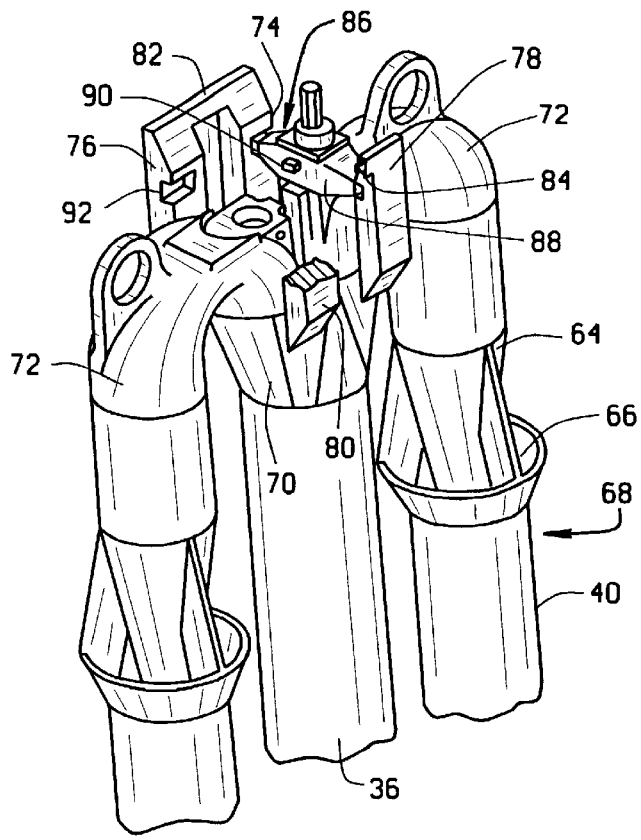
FIG. 2 is a perspective view, with parts cut away, of a jet pump assembly shown in FIG. 1 in accordance with an embodiment of the present invention.

FIG. 2 is a perspective view, with parts cut away, of jet pump assembly 44. Jet pump assembly 44 includes riser pipe 36 coupled to a pair of jet pumps 34 by transition assembly 38. Each jet pump 34 includes a jet pump nozzle 64, a suction inlet 66, an inlet mixer 40, and a diffuser 42 (shown in FIG. 1). Jet pump nozzle 64 is positioned in suction inlet 66 which is located at a first end 68 of inlet mixer 40.

Figure 3:
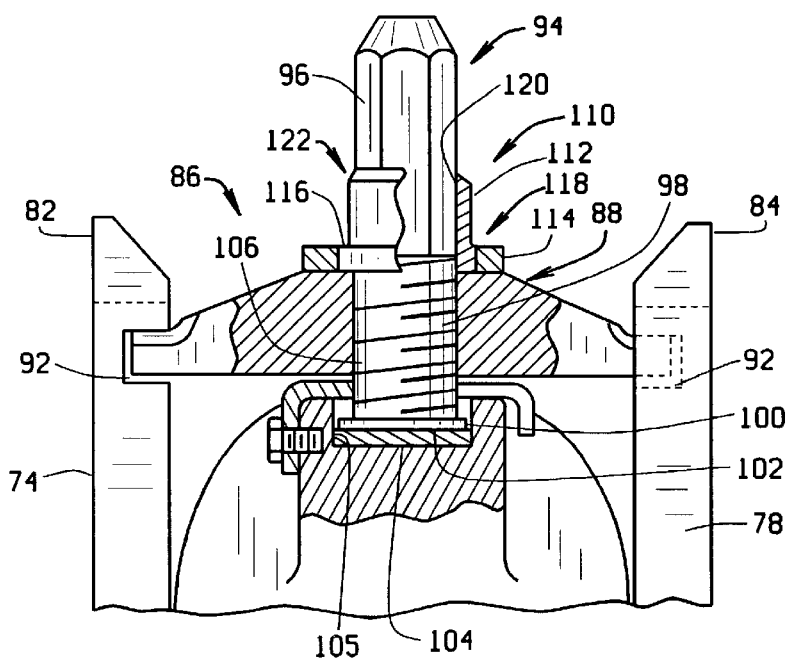
FIG. 3 is a side view of the jet pump beam shown in FIG. 2.

Transition assembly 38 includes a base piece 70 and two elbows 72. Each elbow 72 is coupled to a jet pump nozzle 64. Support arms 74, 76, 78, and 80 extend from transition assembly base piece 70. Cross beam 82 connects support arms 74 and 76, and cross beam 84 (partially cut away in FIG. 2) connects support arms 78 and 80. A jet pump beam 86 extends between support arms 74 and 78. An identical jet pump beam (not shown) extends between support arms 76 and 80. Referring also to FIG. 3, jet pump beam 86 includes a raised central portion 88 and trunions 90. The ends of jet pump beam 86 are supported in notches 92 located in support beams 74 and 78. A beam bolt 94 includes a multisided head 96, a threaded portion 98, and a butt end 100 including a lower bearing surface 102 which bears against a disc 104 seated in a counter bore 105 of elbow 72. Beam bolt 94 threadedly engages a threaded bolt opening 106 in jet pump beam 86.

A locking assembly 110 prevents beam bolt 94 from loosening. Locking assembly 110 includes a locking sleeve 112 and a lock plate 114. Locking sleeve 112 includes a base portion 116 at a first end 118 and a bore 120 extending from first end 118 to a second end 122. Bore 120 is sized and shaped to matingly receive beam bolt head 96.

Figure 4:
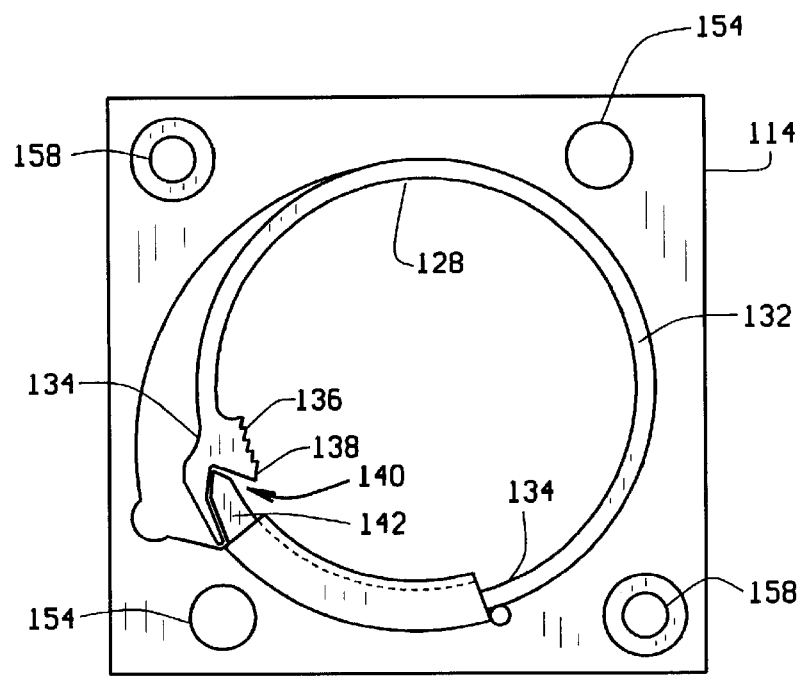
FIG. 4 is a top view of the lock plate shown in FIG. 3.
Figure 5:
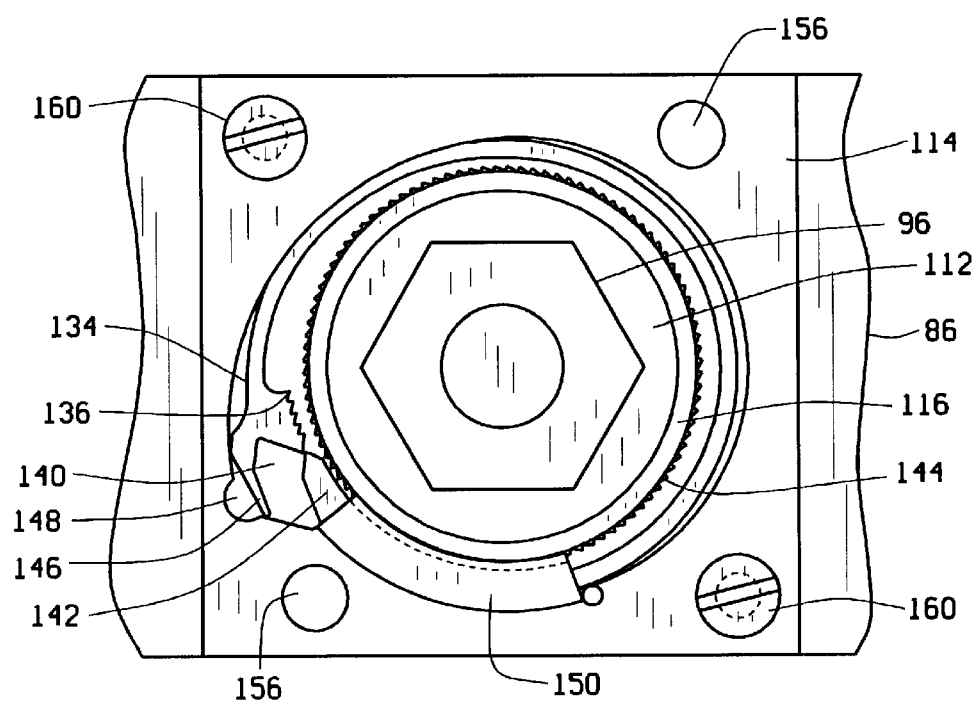
FIG. 5 is a top view of the jet pump beam shown in FIG. 3 with the spring arm ratchet teeth in a disengaged position.
Figure 6:
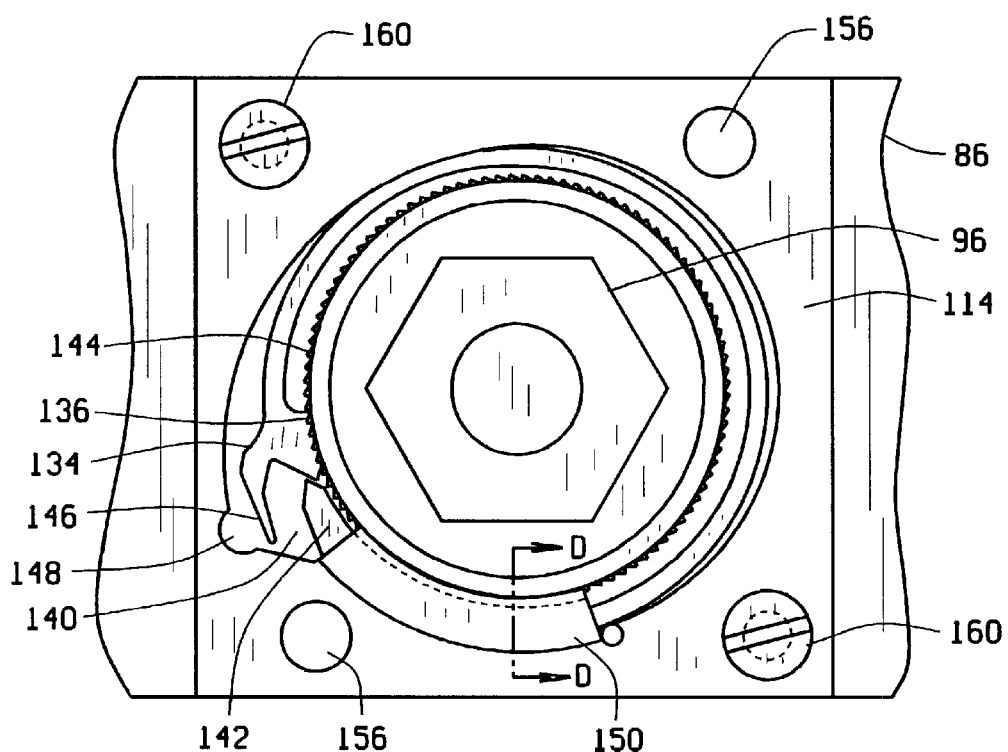
FIG. 6 is a top view of the jet pump beam shown in FIG. 3 with the spring arm ratchet teeth in an engaged position.

FIG. 4 is a top view of lock plate 114, FIG. 5 is a top view of jet pump beam 86 with locking sleeve 112 and lock plate 114 engaged, and FIG. 6 is a top view of jet pump beam 86 with locking sleeve 112 and lock plate 114 disengaged. Referring to FIGS. 4, 5, and 6, lock plate 114 includes a beam bolt opening 126, and an integral beam spring arm 128. Beam bolt opening 126 is sized to receive locking sleeve 112. Spring arm 128 includes a first portion 130 extending from lock plate 114 adjacent beam bolt opening 126, a second portion 132 extending from first portion 130 and extending around a periphery of beam bolt opening 126, and a third portion 134 extending from second portion 132. Third portion 134 includes a plurality of ratchet teeth 136 extending from a side 138 of third portion 134 facing the center of beam bolt opening 126.

Third portion 134 of spring arm 128 also includes a notch 140 located adjacent ratchet teeth 136. Notch 140 is sized to receive a detent 142 extending from lock plate 114 into beam bolt opening 126. Locking sleeve 112 includes a plurality of ratchet teeth 144 located circumferentially around base portion 116 and which are sized to engage and mesh with ratchet teeth 136 of spring arm 128. A tab 146 extends from third portion 134. Tab 146 is used, in conjunction with at simple release cam tool and a cam tool opening 148 in lock plate 114, to deflect spring arm 128 to an engaged or disengaged position.

Spring arm 128 is movable between a first, or engaged, position (shown in FIG. 6) where detent 142 is positioned in notch 140 and spring arm ratchet teeth 136 are engaged with locking sleeve ratchet teeth 144, and a second, or disengaged, position (shown in FIG. 5) where side 138 of third portion 134 of spring arm 128 facing contact with detent 142 and spring arm ratchet teeth 136 are disengaged from locking sleeve ratchet teeth 144. Spring arm 128 is initially machined with third portion displaced radially inboard of the first position so that installation deflects spring arm 128 and produces a radial preload force. Also, in another embodiment, spring arm 128 is machined with a thickness tapering from a maximum at first portion 130 so that the available preload displacement is maximized for a given bending stress induced in spring arm 128. It should be noted that machining of the somewhat complex geometry of locking assembly 110 is made practical by the relatively recent availability of precision controlled wire electrical discharge machining. Any suitable material can be used for locking assembly 110, for example, Ni—Cr—Fe alloy X-750. The X-750 alloy provides high strength, permitting minimum size and weight of locking assembly 110, and provides corrosion resistance in the environment of a boiling water nuclear reactor.

Figure 7:
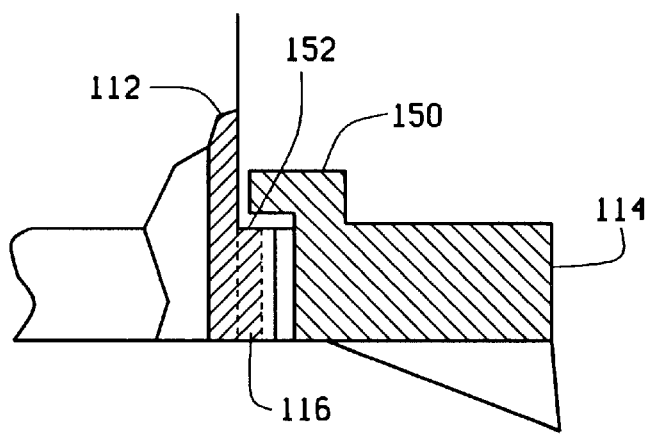
FIG. 7 is a cross sectional view through line D—D of FIG. 6.

Referring also to FIG. 7, lock plate 114 also includes a lip 150 extending at least partially around beam bolt opening 126. Lip 150 is sized to engage an upper surface 152 of locking sleeve base portion 116. Further, lock plate 114 includes at least one guide pin opening 154 sized to receive a jet pump beam guide pin 156 and at least one screw opening 158 sized to receive attachment screws 160.

Locking assembly 110 securely locks beam bolt 94 in place and is easily installed by slipping locking sleeve 112 over mating multisided beam bolt head 96 and mounting lock plate 114 to beam 86. Particularly, guide pin openings 154 are positioned over guide pins 156, and attachment screws 160 are inserted through screw openings 158 and tightened. To ensure that attachment screws 160 do not loosen, screws 160 can be tack welded to lock plate 114 or drilled for insertion of a lock pin. Lip 150 captures locking sleeve 112, and the preload force of spring arm 128 holds locking sleeve 112 securely against vibration. The shape of meshing ratchet teeth 136 and 144 permit tightening of beam bolt 94 with a tensioner to a predetermined torque, but subsequent rotation in the loosening direction is limited by meshed ratchet teeth 136 and 144 to less than one tooth space. Use of close tooth spacing minimizes the corresponding possible variation in bolt position after torqueing. The inclined contact surface between notch 140 and detent 142 wedges the meshing ratchet teeth 136 and 144 more tightly against loosening rotation, providing a self-energized lock.

To loosen beam bolt 94, a simple release cam tool, not shown, having a screw driver shaped end, is used to deflect spring arm 128 to the second position where detent 142 is in contact with side 138 of third portion 134 of spring arm 128 so that spring arm ratchet teeth 136 are disengaged from locking sleeve ratchet teeth 144. Beam bolt 94 can be loosened and tightened repeatedly without replacement.

The above described locking assembly 110 replaces the tack-welded keeper beam bolt locking arrangement of known jet pumps. Also, the above described locking assembly 110 is reusable and facilitates simplified assembly and disassembly of jet pump 34 with a minimum of labor and equipment.

While the invention has been described in terms of various specific embodiments, those skilled in the art will recognize that the invention can be practiced with modification within the spirit and scope of the claims.

What is claimed is:

1. A locking device for a jet pump beam, the jet pump beam comprising a beam bolt having a head and at least one guide pin, said locking device comprising:

a locking sleeve comprising a bore extending from a first end to a second end of said locking sleeve, and a plurality of ratchet teeth around the periphery of said locking sleeve, said bore sized and shaped to receive a beam bolt head; and a lock plate comprising a beam bolt opening, and an integral beam spring arm, said bolt opening sized to receive said locking sleeve, said spring arm comprising a plurality of ratchet teeth extending from at least a portion of a side of said spring arm facing the center of said beam bolt opening, said spring arm ratchet teeth sized to mesh with said ratchet teeth of said locking sleeve.

2. A locking device in accordance with claim 1 wherein said locking sleeve comprises a base portion having an upper surface, said plurality of ratchet teeth extending around the periphery of said base portion.

3. A locking device in accordance with claim 2 wherein said lock plate further comprises a lip extending at least partially around said beam bolt opening, said lip sized to engage said upper surface of said base portion of said locking sleeve.

4. A locking device in accordance with claim 3 wherein said spring arm comprises a first portion extending from said lock plate adjacent said beam bolt opening, a second portion extending from said first portion and extending around a periphery of said beam bolt opening, and a third portion extending from said second portion, said third portion comprising a plurality of said ratchet teeth extending from a side of said third portion facing the center of said beam bolt opening.

5. A locking device in accordance with claim 4 wherein said third portion of said spring arm further comprises a notch and a tab extending from said third portion adjacent said notch, said notch sized to receive a detent extending from said lock plate.

6. A locking device in accordance with claim 5 wherein said spring arm is movable between a first position wherein said detent is positioned in said notch and said spring arm ratchet teeth are engaged with said locking sleeve ratchet teeth, and a second position wherein said side of said third portion facing the center of said beam bolt opening is in contact with said detent and said spring arm ratchet teeth are disengaged from said locking sleeve ratchet teeth.

7. A locking device in accordance with claim 1 wherein said lock plate further comprises at least one guide pin opening sized to receive a jet pump beam guide pin.

8. A jet pump assembly comprising:

a riser pipe;

at least one inlet mixer;

at least one diffuser coupled to said at least one inlet mixer;

a transition assembly comprising at least two support arms, said riser pipe coupled to said at least one inlet mixer by said transition assembly;

a jet pump beam extending between two of said at least two support arm, said jet pump beam comprising a threaded bolt opening;

a beam bolt extending through and threadedly engaging said beam bolt opening; and a locking device comprising:

a locking sleeve comprising a bore extending from a first end to a second end of said locking sleeve, and a plurality of ratchet teeth around the periphery of said locking sleeve, said bore sized and shaped to receive said beam bolt; and a lock plate comprising a beam bolt opening, and an integral beam spring arm, said bolt opening sized to receive said locking sleeve, said spring arm comprising a plurality of ratchet teeth extending from at least a portion of a side of said spring arm facing the center of said beam bolt opening, said spring arm ratchet teeth sized to mesh with said ratchet teeth of said locking sleeve.

9. A jet pump assembly in accordance with claim 8 wherein said locking device locking sleeve comprises a base portion having an upper surface, said plurality of ratchet teeth extending around the periphery of said base portion.

10. A jet pump assembly in accordance with claim 9 wherein said locking device lock plate further comprises a lip extending at least partially around said beam bolt opening, said lip sized to engage said upper surface of said base portion of said locking sleeve.

11. A jet pump assembly in accordance with claim 10 wherein said spring arm comprises a first portion extending from said lock plate adjacent said beam bolt opening, a second portion extending from said first portion and extending around a periphery of said beam bolt opening, and a third portion extending from said second portion, said third portion comprising a plurality of said ratchet teeth extending from a side of said third portion facing the center of said beam bolt opening.

12. A jet pump assembly in accordance with claim 11 wherein said third portion of said spring arm further comprises a notch and a tab extending from said third portion adjacent said notch, said notch sized to receive a detent extending from said lock plate.

13. A jet pump assembly in accordance with claim 12 wherein said spring arm is movable between a first position wherein said detent is positioned in said notch and said spring arm ratchet teeth are engaged with said locking sleeve ratchet teeth, and a second position wherein said side of said third portion facing the center of said beam bolt opening is in contact with said detent and said spring arm ratchet teeth are disengaged from said locking sleeve ratchet teeth.

14. A jet pump assembly in accordance with claim 8 wherein said jet pump beam further comprises at least one guide pin and said lock plate further comprises at least one guide pin opening sized to receive said at least one jet pump beam guide pin.

15. A method of locking a jet pump beam in a jet pump assembly, the jet pump assembly comprising a riser pipe, two inlet mixers, a transition assembly comprising at least two support arms, the riser pipe coupled to the inlet mixers by the transition assembly, a jet pump beam extending between two of the support arms and comprising a threaded bolt opening, and a beam bolt, said method comprising the steps of:

extending the beam bolt through and threadedly engaging the beam bolt opening;

installing a locking device on the beam and beam bolt; and tightening the beam bolt to lock the jet pump beam in place, said locking device comprising:

a locking sleeve comprising a bore extending from a first end to a second end of the locking sleeve, and a plurality of ratchet teeth around the periphery of the locking sleeve, the bore sized and shaped to receive the beam bolt; and a lock plate comprising a beam bolt opening, and an integral beam spring arm, the bolt opening sized to receive the locking sleeve, the spring arm comprising a plurality of ratchet teeth extending from at least a portion of a side of the spring arm facing the center of the beam bolt opening, the spring arm ratchet teeth sized to mesh with the ratchet teeth of the locking sleeve.

16. A method in accordance with claim 15 wherein installing a locking device comprises the steps of:

slipping the locking sleeve over the beam bolt head; and mounting the lock plate on the jet pump beam.

17. A method in accordance with claim 16 wherein the locking sleeve comprises a base portion having an upper surface, the plurality of ratchet teeth extending around the periphery of the base portion, and the lock plate comprises a lip extending at least partially around the beam bolt opening, the lip sized to engage the upper surface of the base portion of the locking sleeve, and mounting the lock plate comprises the step of attaching the lock plate to the beam so that the lock plate lip engages the top surface of the base portion of the locking sleeve.

18. A method in accordance with claim 16 wherein the spring arm comprises a first portion extending from the lock plate adjacent the beam bolt opening, a second portion extending from the first portion and extending around a periphery of the beam bolt opening, and a third portion extending from the second portion, the third portion comprising a plurality of ratchet teeth extending from a side of the third portion facing the center of the beam bolt opening, a notch sized to receive a detent extending from said lock plate, and a tab extending from the third portion adjacent the notch, and mounting the lock plate on the jet pump beam comprises the steps of:

moving the spring arm to a first position wherein the side of the third portion facing the center of the beam bolt opening is in contact with the detent and the spring arm ratchet teeth are disengaged from the locking sleeve ratchet teeth;

mounting the lock plate on the jet pump beam;

moving the spring arm to a second position wherein the detent is positioned in the notch and the spring arm ratchet teeth are engaged from said locking sleeve ratchet teeth.

19. A locking device for a jet pump beam, the jet pump beam comprising a beam bolt having a head and at least one guide pin, said locking device comprising:

a locking sleeve comprising a bore extending from a first end to a second end of said locking sleeve, a base portion having an upper surface, and a plurality of ratchet teeth around the periphery of said base portion, said bore sized and shaped to receive a beam bolt; and a lock plate comprising a beam bolt opening, a lip extending at least partially around said beam bolt opening, and an integral beam spring arm, said bolt opening sized to receive said locking sleeve, said spring arm comprising a plurality of ratchet teeth extending from at least a portion of a side of said spring arm facing the center of said beam bolt opening, said spring arm ratchet teeth sized to mesh with said ratchet teeth of said locking sleeve, said lip sized to engage said upper surface of said base portion of said locking sleeve.

20. A locking device in accordance with claim 19 wherein said spring arm comprises a first portion extending from said lock plate adjacent said beam bolt opening, a second portion extending from said first portion and extending around a periphery of said beam bolt opening, and a third portion extending from said second portion, said third portion comprising a plurality of said ratchet teeth extending from a side of said third portion facing the center of said beam bolt opening.

21. A locking device in accordance with claim 20 wherein said third portion of said spring arm comprises a notch and a tab extending from said third portion adjacent said notch, said notch sized to receive a detent extending from said lock plate.

22. A locking device in accordance with claim 21 wherein said spring arm is movable between a first position wherein said detent is positioned in said notch and said spring arm ratchet teeth are engaged with said locking sleeve ratchet teeth, and a second position wherein said side of said third portion facing the center of said beam bolt opening is in contact with said detent and said spring arm ratchet teeth are disengaged from said locking sleeve ratchet teeth.

* * * * *